United States Patent
Pellenc

(10) Patent No.: US 6,808,036 B2
(45) Date of Patent: Oct. 26, 2004

(54) ELECTRONIC ANTI-SKID DEVICE AND METHOD FOR MOTOR VEHICLE WITH HYDROSTATIC TRANSMISSION

(75) Inventor: Roger Pellenc, Pertuis (FR)

(73) Assignee: Pellenc, S.A., Quartier Notre Dame Pertuis (FR)

( * ) Notice: Subject to any disclaimer, the term of this patent is extended or adjusted under 35 U.S.C. 154(b) by 0 days.

(21) Appl. No.: 10/169,577

(22) PCT Filed: Jan. 12, 2001

(86) PCT No.: PCT/FR01/00104

§ 371 (c)(1),
(2), (4) Date: Oct. 4, 2002

(87) PCT Pub. No.: WO01/51304

PCT Pub. Date: Jul. 19, 2001

(65) Prior Publication Data

US 2003/0111288 A1   Jun. 19, 2003

(30) Foreign Application Priority Data

Jan. 13, 2000  (FR) .............................. 00 00401

(51) Int. Cl.$^7$ ..................... B60K 17/00; B60K 17/14; G06F 7/00; B60B 7/12; B60T 7/12
(52) U.S. Cl. .................. 180/197; 180/305; 180/308; 180/242; 701/69; 701/71; 701/74; 701/82
(58) Field of Search ............................ 180/305, 307, 180/308, 197, 242, 243, 6.3, 6.48; 701/69, 71, 72, 74, 24, 82, 89, 41

(56) References Cited

U.S. PATENT DOCUMENTS

| | | | | |
|---|---|---|---|---|
| 3,199,286 A | * | 8/1965 | Anderson ................ | 60/420 |
| 4,157,125 A | * | 6/1979 | Bushell et al. ............ | 180/212 |
| 5,147,010 A | * | 9/1992 | Olson et al. .............. | 180/197 |
| 5,201,570 A | * | 4/1993 | Heren et al. .............. | 303/10 |
| 6,116,705 A | * | 9/2000 | Takemoto et al. ......... | 303/158 |
| 6,135,231 A | * | 10/2000 | Reed ....................... | 180/308 |
| 6,176,336 B1 | * | 1/2001 | Bourne et al. ............ | 180/197 |
| 6,408,972 B1 | * | 6/2002 | Rodgers et al. ........... | 180/197 |

FOREIGN PATENT DOCUMENTS

| | | |
|---|---|---|
| DE | 199 18 882 A | 12/1999 |
| EP | 0 347 804 A | 12/1989 |
| EP | 0 816 153 A | 1/1998 |
| EP | 0 881 114 A | 12/1998 |

\* cited by examiner

*Primary Examiner*—Christopher P. Ellis
*Assistant Examiner*—G. B. Klebe
(74) *Attorney, Agent, or Firm*—Harrison & Egbert

(57) ABSTRACT

An electronic anti-skid device for motor vehicles with hydrostatic transmission has at least one sensor for the transmission of data pertaining to the output of the hydrostatic transmission, a steering angle detector and an electronic computer. The electronic computer uses data from the sensor to calculate theoretical power output of the hydraulic motors of the driver wheels of the vehicles and, thus, the theoretical speed of the wheels. The electronic computer is programmed to scan the detectors at very rapid intervals, and to adjust, on each scan, hydraulic output from output regulators. The output regulators have electrical controllers and are coupled to each hydraulic motor of a driven wheel way as to limit the power from each regulator to a value marginally above the theoretical output for the motor of the wheel to which the power regulator is connected.

9 Claims, 4 Drawing Sheets

ELECTRONIC ANTI-SKID DEVICE AND METHOD FOR MOTOR VEHICLE WITH HYDROSTATIC TRANSMISSION

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention presented here involves an anti-skid device and process for a vehicle with a hydrostatic transmission.

It is also intended for vehicles with hydrostatic transmissions provided with this anti-skid device.

BACKGROUND OF THE INVENTION

Vehicles with hydrostatic transmissions are vehicles whose driven wheels are driven by hydraulic motors. The thermal engine of these vehicles is coupled to a hydraulic pump; this pump is itself connected to each of the hydraulic motors, which drive the wheels, where these wheels themselves ensure that the vehicle is driven. In order to ensure the differential effect between the wheels, the effect necessary so that the speed of the wheels can independently adapt to the situation of the vehicle in curves, the hydraulic motors are connected, generally in parallel, on the hydraulic pump. This differential makes it possible to drive the driven wheels at different rotational speeds, for example, in curves or when their pneumatic tires have inequalities of inflation, wear and tear, or load, while thus allowing these wheels to adapt to the conditions of speed and to adhesion that they encounter.

In hydraulic transmissions, in order to obtain the differential effect, it is made certain that the motors of the wheels, whether for the transmissions having two driven wheels, three driven wheels, four driven wheels, six driven wheels, etc., are all connected in parallel. This hydraulic assembly allows a differential effect between all of the driven wheels.

When the adhesion is not sufficient on one wheel, the differential effect automatically makes it so that it skids, due to the fact that it begins to turn more quickly than the speed at which it would have to turn if the adhesion were normal.

The object of the invention is thus a device and a process that allows a vehicle with a hydrostatic transmission with at least two driven wheels to prevent the skidding of the wheels while maintaining the differential effect between the driven wheels.

An anti-skid device for vehicles with a hydrostatic transmission that has an electronic control is known from the prior-art; moreover, this device has been used by the applicant until now.

In the example of the application of this known device to the equipment of a four-wheel vehicle with two driven wheels, this device consists of a speed sensor on each driven wheel and at least one speed sensor on a non-driven wheel. On the other hand, the vehicle is also provided with a direction angle sensor and a hydrostatic transmission with a pump having a variable output connected in parallel to two hydraulic motors of driven wheels. These different sensors are connected to a computer. This computer calculates the theoretical speed at which each of the driven wheels must turn. To do this, it uses the data of the speed sensors of the non-driven wheels as well as the data of the direction angle sensor.

A diagram of the vehicle and the rolling circumference of its wheels are data programmed in the memory of the computer. At each moment, the computer compares the theoretical calculated speed of each of the driven wheels with their actual speed measured by their own sensors, whether in a straight line, in a curve, moving forward, or moving in reverse. When the actual speed of at least one driven wheel is greater than its theoretical speed, the computer determines that skidding is involved. From then on, the computer acts on a valve for limiting the proportional output coupled to the hydraulic motor of each of the wheels, in a manner so as to reduce the excess speed of the wheel that is skidding to the theoretical speed.

This device, however, has the major disadvantage of reacting with a delay. In fact, it is necessary for the wheel to have already started skidding so that the computer detects the skidding, and commands a corrective procedure. The wheel has already started at excess speed when the proportional valve acts in order to reduce the speed to the theoretical speed. The consequences are such that the wheel that skids has already dug a hole in the ground due to the skidding. The hole thus dug, even if the wheels no longer skid, can cause severe mobility problems.

In addition, the obligatory use of wheel sensors makes necessary the passage of electric cables near the wheel hubs which is another serious disadvantage when the machines work in the ground.

The device and the process, the object of the invention, have the purpose of preventing any possibility of skidding and thus preventing the wheels from digging holes causing the immobilization of the vehicle.

BRIEF SUMMARY OF THE INVENTION

The device according to the invention applicable to vehicles with a hydrostatic transmission provided with at least one sensor fitted to transmit data making it possible to calculate the output of the hydrostatic transmission, from a direction angle sensor and an electronic computer that uses the data of these sensors in order to calculate the theoretical output of the hydraulic motors of the driven wheels of these vehicles and, as a result, the theoretical speed of these wheels, is mainly notable in that the sensors are scanned at very close intervals, for example every ten milliseconds, by the computer programmed in order to adjust, at each scanning, the hydraulic outputs of the output regulators by the electric control coupled to each hydraulic motor of the driven wheel, in a manner so as to limit the output of each output regulator to a value slightly greater than the theoretical output, determined by the computer, of the motor of the wheel to which this output regulator is coupled.

According to anti-skid process of the invention applicable to vehicles with a hydrostatic transmission provided with at least one sensor fitted to transmit data making it possible to calculate the output of the hydrostatic transmission, from a direction angle sensor and an electronic computer parameterized so that it uses the data of these sensors in order to calculate the theoretical output of the hydraulic motors of the driven wheels of these vehicles and, as a result, the theoretical speed of these wheels, the sensors are scanned at very close intervals, for example every ten milliseconds, by the electronic computer used in order to adjust, at each scanning, the hydraulic outputs of the output regulators by the electric control coupled to each hydraulic motor of the driven wheel, in a manner so as to limit the output of each output regulator to a value slightly greater than the theoretical output, determined by the computer, of the hydraulic motor of the wheel to which this output regulator is coupled.

The process and the device of the invention prevent any instantaneous runaway and eliminate any possibility for appreciable skidding of the driven wheels of the vehicle, regardless of the number of driven wheels of the vehicle, its direction of movement (straight line, in a curve, in forward, in reverse) and the type of surface on which it is moving.

The output of each output regulator can be limited to a value corresponding to a wheel speed of 0 to 10% and, preferably, from 3 to 4% greater than the theoretical speed of each of the driven wheels.

In the hypothesis where a wheel is in a skidding situation, it can only skid from 3 to 4% relative to its theoretical speed. This skidding, if it is produced, is thus insignificant and does not cause any transmission problems.

Taking into account the fact that the output regulators are regulated at 3 to 4% above their theoretical value, the hydraulic circuit of the hydrostatic transmission functions in normal conditions. The device does not generate any high pressure. The efficiency of this system is identical to that of a system that does not have anti-skid. This system does not depend on the response time of the electronics or the regulators, thus there is no actual skidding.

The anti-skid device according to the invention also has the advantage that it can be used as a hydrostatic brake for engines having four driven wheels, when they are on slopes. In fact, on large slopes when the load is transferred a great deal onto the front wheels, the computer will determine this situation and, in case of braking, the output regulators will regulate an output a few percent less than the theoretical speed; i.e. the output regulator will constantly brake the wheels. This solution prevents the less loaded rear wheels of the vehicle from locking or turning in the reverse direction.

BRIEF DESCRIPTION OF THE SEVERAL VIEWS OF THE DRAWINGS

The goals, characteristics and advantages above, and even others, are better shown from the description that follows and the attached drawings.

DETAILED DESCRIPTION OF THE INVENTION

Reference is made to the drawings in order to describe examples that are of interest and in no way restrictive, of the embodiment of the device and the implementation of the process of the invention.

Figure 1:
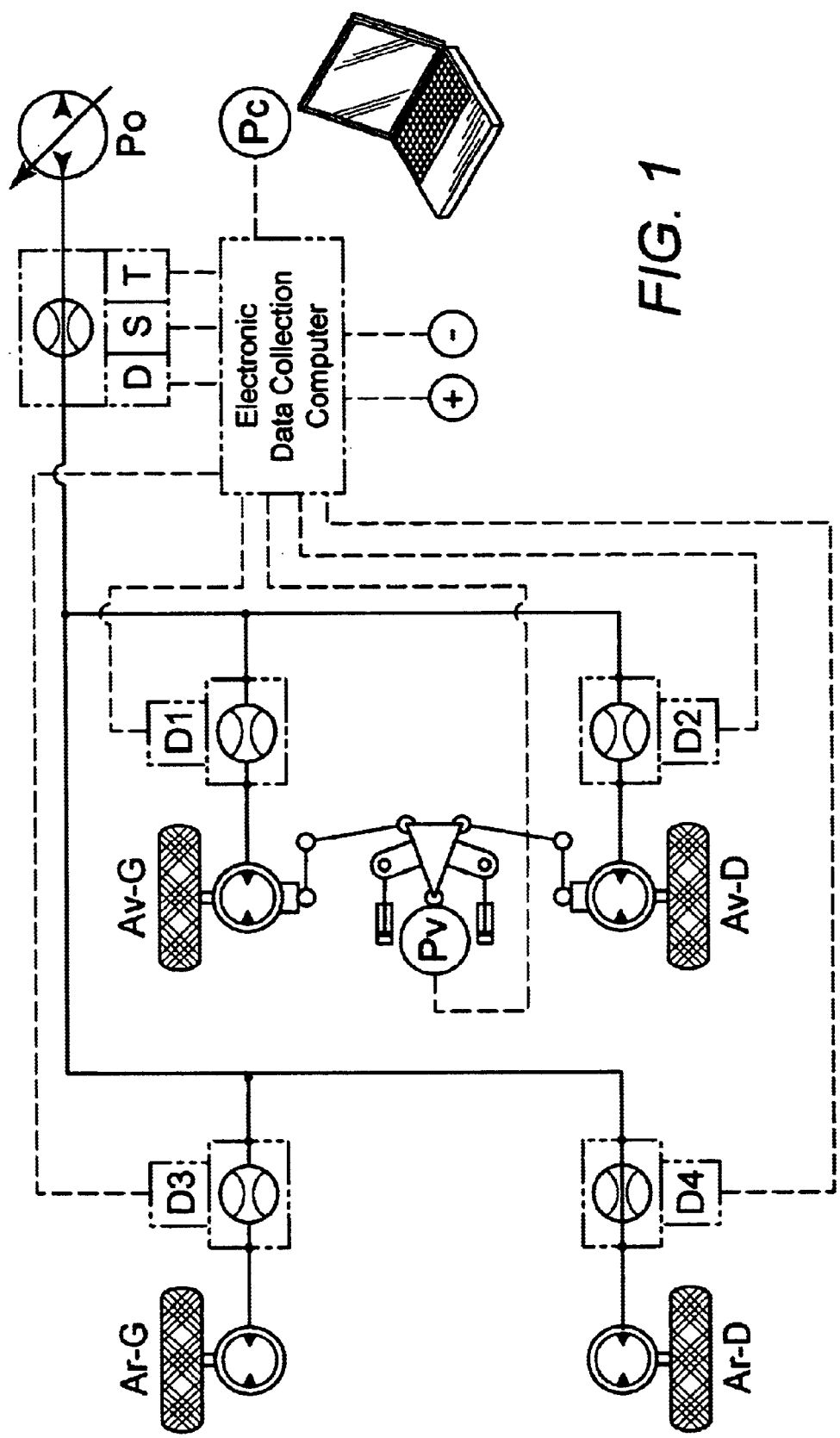
FIG. 1 shows the hydraulic diagrammatic illustration of the principle of the device of the invention applied to a vehicle having four driven wheels and whose sensor, necessary for the computer in order to calculate the theoretical output of the hydraulic motors of the driven wheels, is comprised of an output meter.

Shown in FIG. 1 is the diagram of the hydraulic circuit of a vehicle having a hydrostatic transmission that, according to this example, is provided with four driven wheels Av-D, Av-G, Ar-D, Ar-G (Front-R, Front-L, Rear-R, Rear-L) whose rotation is ensured individually by a hydraulic motor. The working fluid is provided to the motors of the driven wheels by a hydrostatic pump Po to which the motors are connected in parallel.

The control system of this hydraulic installation consists notably of:

an electronic computer parameterized in a known manner, in order to calculate the theoretical speed at which each of the driven wheels of the vehicle must turn, whether in a straight line, in a curve, in forward, or in reverse;

one or more sensors providing data to this computer in order to allow it to calculate the theoretical output of the hydraulic motors of the driven wheels; and a sensor for the direction angle Pv.

Figure 2:
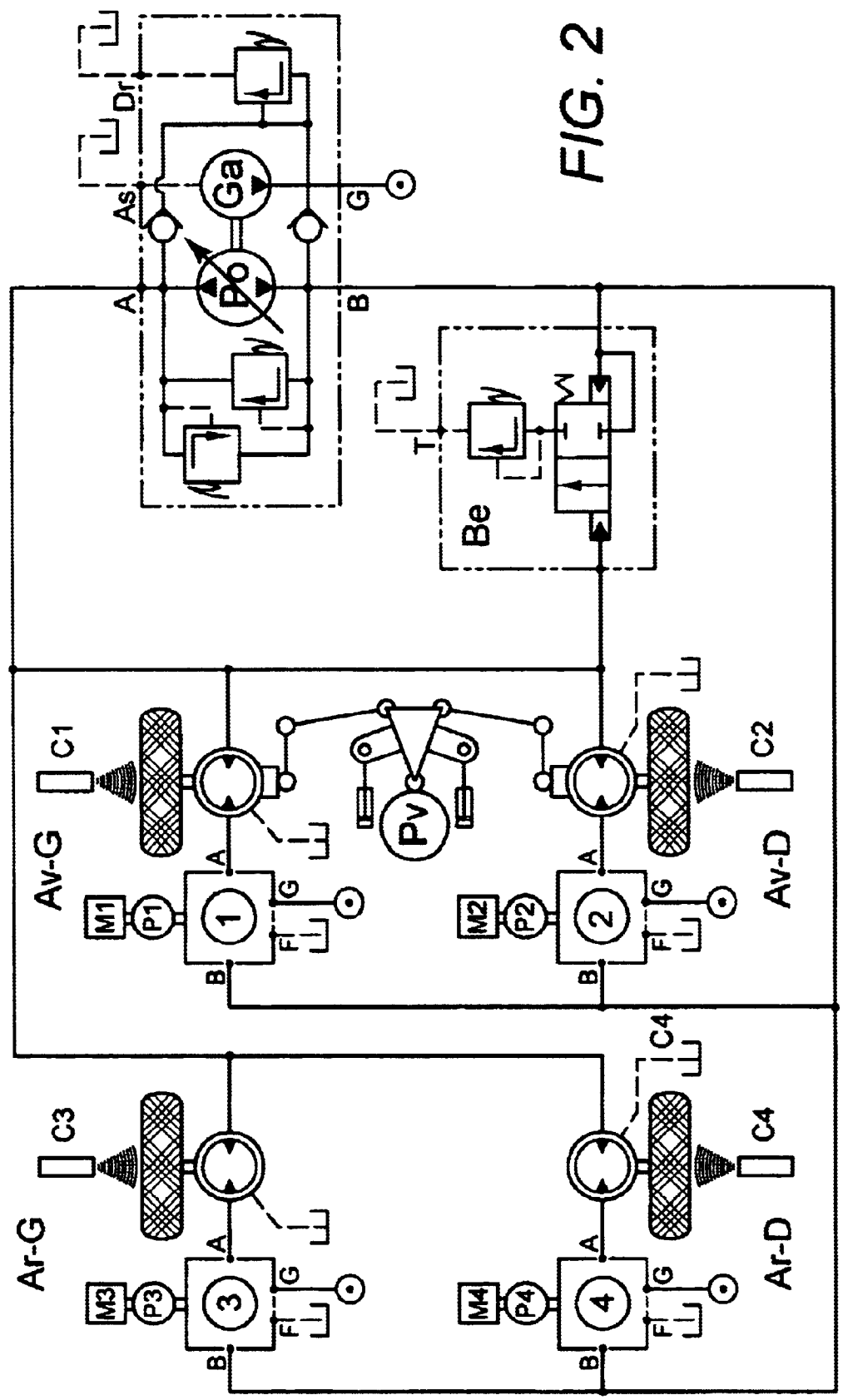
FIG. 2 shows the hydraulic diagrammatic illustration of the principle of the, device of an embodiment variation of the device of the invention also applied to a vehicle having four driven wheels and whose sensors, necessary for the computer in order to calculate the theoretical output of the hydraulic motors of the driven wheels, are comprised of a wheel sensors.

In FIG. 2, the reference Be indicates an "interchange" block allowing a constant regeneration of the oil of the circuit from the hydrostatic transmission which functions in a closed loop.

It is recalled that the rotational speed of a vehicle wheel having a hydrostatic transmission is a direct function of the hydraulic output and the volumetric displacement of the hydraulic motor of this wheel, where the volumetric displacement of the motor is a known constant in construction.

The rotational speed of a wheel is obtained from the equation:

$$\text{Rotational speed of the wheel (in rpm)} = \frac{\text{Hydraulic output in cm}^3 \text{ per minute}}{\text{Volumetric displacement of the motor in cm}^3 \text{ per revolution}}$$

According to a first characteristic arrangement of the invention, pressure offset output regulators D1, D2, D3 and D4 having an electric control are coupled respectively to each of the hydraulic motors of the driven wheels Av-D, Av-G, Ar-D, Ar-G (Front-R, Front-L, Rear-R, Rear-L). The electric control is programmed and used to scan, at very close intervals, for example, every ten milliseconds, the sensors mentioned above and in order to adjust, at each scanning, the hydraulic outputs of the output regulators D1, D2, D3 and D4 in a manner so as to limit the output of each of them to a value slightly greater than the theoretical value, determined by the computer of the hydraulic motor of the driven wheel, to which this output regulator is coupled, this theoretical output corresponding to the theoretical rotational speed of the wheels.

In other words, the above device makes it possible to limit the rotational speed of each driven wheel to a value slightly greater than its theoretical rotational speed determined by the computer.

For example, the computer can be programmed in order to act on the output regulators D1, D2, D3 and D4 in a manner so that they limit their output to a value corresponding to a wheel speed of 0 to 10% and, preferably, of 3 to 4% greater than the theoretical speed of each of the hydraulic driven wheels.

According to another characteristic arrangement of the invention, the sensor used in order to supply data to the computer itself makes it possible to calculate the theoretical output of the hydraulic motors of the driven wheels, and is comprised of an output meter DST, mounted, preferably, on the outlet of the "Forward Movement" output of the hydraulic pump Po of the hydrostatic transmission. This output meter is configured in order to capture and transmit information about the output of oil, and, preferably, also additional information about the direction of the hydraulic output and/or temperature of the hydraulic fluid.

Figure 3:
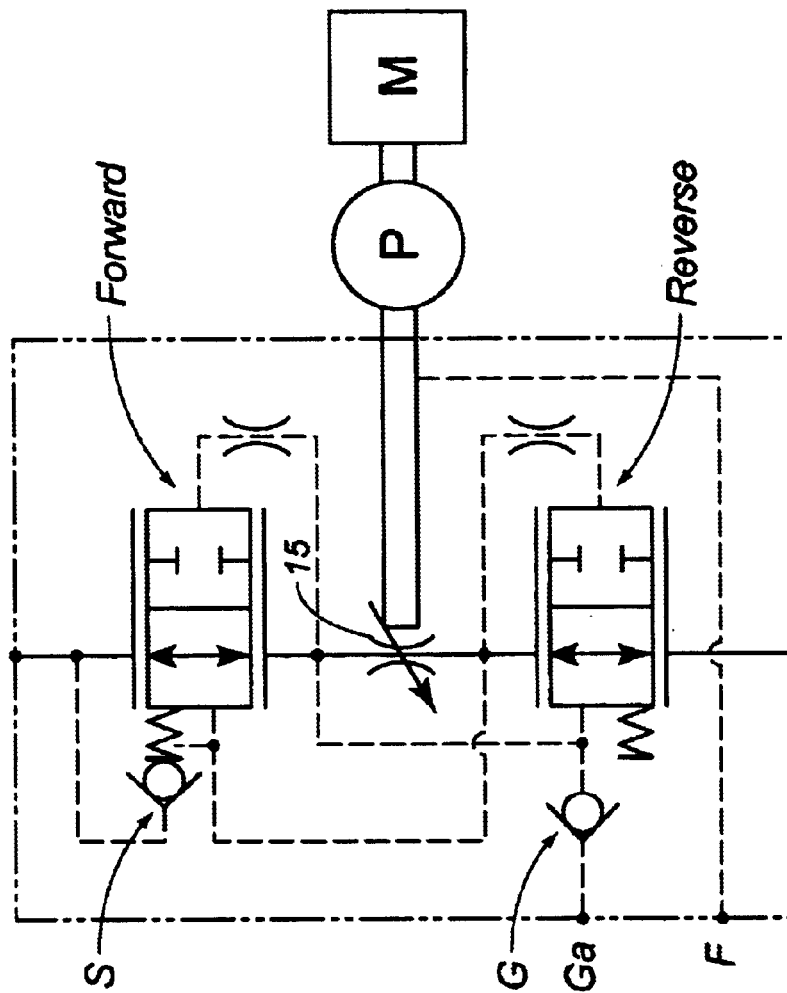
FIG. 3 shows a diagrammatic illustration of a proportional pressure offset output regulator made according to the invention.

The pressure offset output regulators D1, D2, D3 and D4 consist of (FIG. 3) a hydraulic block consisting of an adjustable linear choke 15 having a thin wall, at least one pressure balance, and, if necessary, two hydraulic pressure balances, one for forward movement and the other for the reverse movement, these balances ensure the pressure offset. These output regulators also consist, preferably, of an anti-cavitation supercharging valve G and a pressure control valve S calibrated to a pressure at least greater by an amount 10% than the working pressure of the hydrostatic transmission of the vehicle, in FIG. 3, the reference Ga designates a hydraulic supercharging opening, while the reference F designates a hydraulic opening for the recovery of drainage leaks.

In an advantageous manner, the adjustable linear choke 15 having a thin wall is controlled by an electric motor M coupled to the position sensor P, for example, comprised of a rotating potentiometer, in a manner so as to create an open loop controlled by the computer.

According to one implementation variation, it is planned to control the adjustable linear choke having a thin wall, step by step by means of an electric motor, making possible control by open loop of the choke.

The output regulators configured in the manner indicated above produce very low load losses, in a manner so that the device according to the invention consumes very little energy in order to function. In addition, these regulators are designed in order to function over the entire output range of the hydraulic pump of the hydrostatic transmission. Of course, the computer is configured in order to control as many output regulators as necessary; this of course as a function of the number of driven wheels.

According to an embodiment variation shown in FIG. 2, the sensors, necessary for the computer in order to calculate the theoretical output of the hydraulic motors of the driven wheels Av-D, Av-G, Ar-D, Ar-G (Front-R, Front-L, Rear-R, Rear-L), are comprised of wheel sensors C1, C2, C3, C4 making it possible to measure the rotational speed of these driven wheels.

According to another embodiment variation (not shown), the sensor, necessary for the computer in order to calculate the theoretical output of the hydraulic motors of the driven wheels, in applications to the equipment of the vehicles having a hydrostatic transmission comprising one or more non-driven wheels, is comprised of a sensor that makes it possible to measure the rotational speed of at least one non-driven wheel.

According to another embodiment variation, the sensor necessary for the computer in order to calculate the theoretical output of the hydraulic motors of the driven wheels, is comprised of a Doppler radar.

According to another embodiment variation, the sensor(s) necessary for the computer in order to calculate the theoretical output of the hydraulic motors of the driven wheels, is or are comprised of one or more absolute location sensors, for example of the GPS type making it possible to determine the absolute speed of the vehicle relative to the ground.

According to another characteristic arrangement of the invention, the electronic computer is provided with digital inputs and outputs allowing it to communicate with an outside interface (for example, a PC) in order to parameterize the computer and ensure the management of the diagnostic function.

Figure 4:
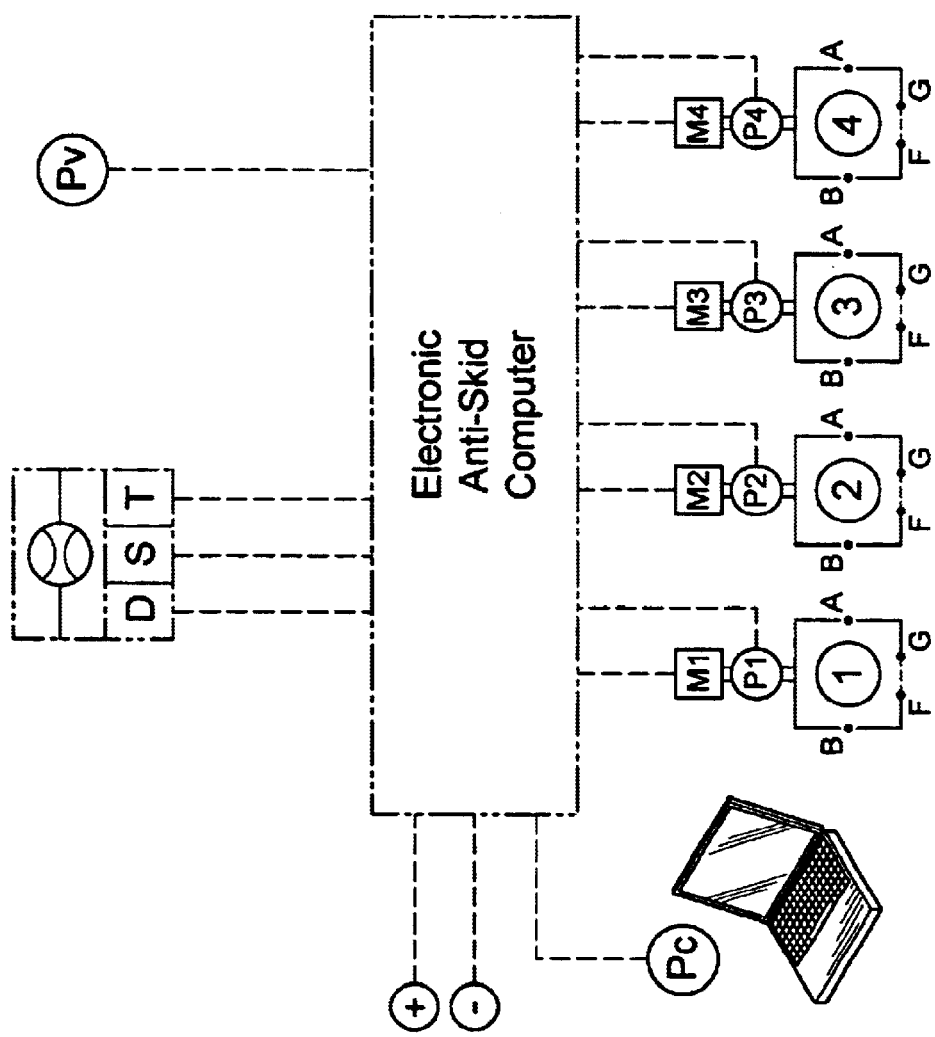
FIG. 4 shows the electric diagrammatic illustration of the principle of the device of the invention applied to a vehicle having four driven wheels.

Shown in FIG. 4 is an electronic diagram of the anti-skid device according to the invention applied to a vehicle having a hydrostatic transmission and four driven wheels.

Shown in this diagram are:

the output meter DST and the direction angle sensor PV the electronic computer;

the pressure offset output regulators 1, 2, 3, and 4 coupled to the hydraulic motors of the driven wheels of the vehicle;

the electric motors M1, M2, M3, and M4 for control of these output regulators;

the position potentiometers P1, P2, P3 and P4 coupled to these electric motors; and a PC connection for loading parameters and functioning diagnostics.

The invention also involves vehicles having a hydrostatic transmission with two, three, four, six, driven wheels, equipped with an anti-skid device as described above.

I claim:

1. An electronic anti-skid device comprising:

a vehicle having a hydrostatic transmission and a plurality of driven wheels, each of said plurality of driven wheels having a rotational speed and a hydraulic motor, said hydrostatic transmission having a pump;

a plurality of output regulators coupled respectively to the hydraulic motors;

an angle direction sensor means for sensing a direction of said vehicle;

an electronic computer means;

a sensor means for constantly measuring an output of said pump of said hydrostatic transmission, said sensor means for determining volume and flow direction and temperature of said output, said electronic computer means for using data from said angle direction sensor and from said sensor means so as to constantly calculate a theoretical rotational speed of each of said plurality of driven wheels, said electronic computer means for controlling said plurality of output regulators at a value slightly greater than or approximately equal to a theoretical hydraulic output corresponding to the theoretical rotational speed of each of said plurality of wheels.

2. The electronic anti-skid device of claim 1, each of said plurality of output regulators comprising:

an adjustable linear choke having a thin wall for fluid pressure balance;

an anti-cavitation supercharging valve in fluid communication with said choke; and a pressure control valve in fluid communication with said choke, said pressure control valve calibrated to a pressure greater than a working pressure of said hydrostatic transmission.

3. The electronic anti-skid device of claim 2, further comprising:

an electronic motor controlledly connected to said choke; and a rotating potentiometer coupled to said electric motor, said rotating potentionmeter being controlled by said electronic computer means in an open loop.

4. The electronic anti-skid device of claim 2, further comprising:

an electronic motor means connected to said choke for controlling said choke in a stepwise manner in an open loop.

5. The electronic anti-skid device of claim 1, said sensor means being an output meter mounted on an output of said pump of said hydrostatic transmission.

6. The electronic anti-skid device of claim 1, said electronic computer means having a digital input and a digital output, each suitable for connection to outside interface.

7. The electronic anti-skid device of claim 1, said sensor means comprising a plurality of wheel sensors, said sensor means for measuring a rotational speed of said plurality of driven wheels.

8. The electronic anti-skid device of claim 1, said vehicle having at least one non-driven wheel, said sensor means being a sensor interactive with the non-driven wheel.

9. An anti-skid process for a vehicle having a hydrostatic transmission, the vehicle having a plurality of driven wheels, each of the plurality of driven wheels having an output regulator coupled to a hydraulic motor, the vehicle having an angle direction sensor and an electronic computer for controlling the output regulators, the process comprising:

constantly measuring data for an output of a pump of the hydrostatic transmission with a sensor, the output being volume and flow direction and temperature;

constantly calculating a theoretical rotational speed of each of the plurality of driven wheels of each of the plurality of driven wheels from the constantly measured data and from data from the angle direction sensor;

controlling the output regulators for the plurality of driven wheels at a value slightly greater than or approximately equal to a theoretical hydraulic output corresponding to the theoretical rotational speed of each of the plurality of driven wheels.

* * * * *